United States Patent Office 3,470,865
Patented Oct. 7, 1969

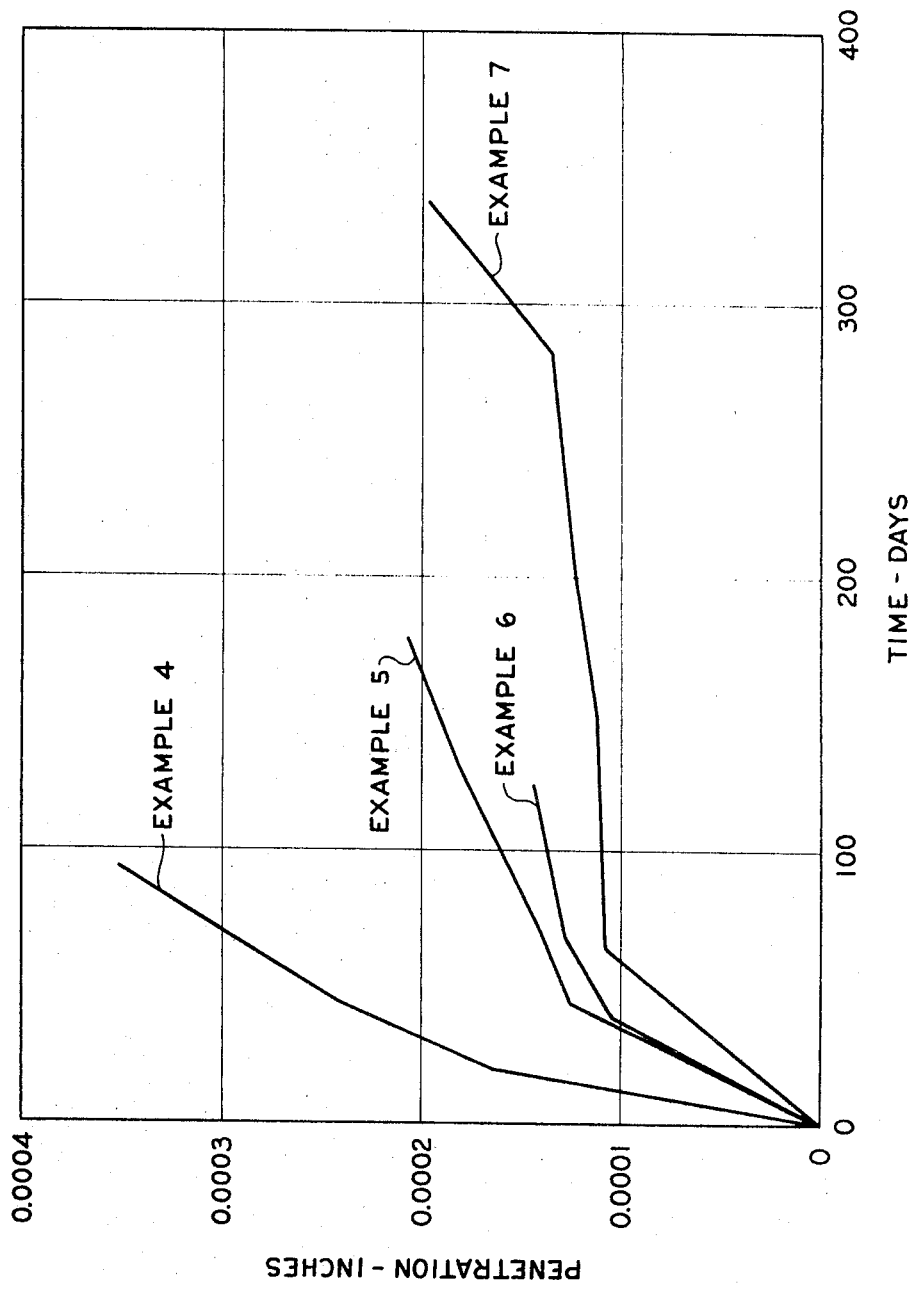

3,470,865
METHOD FOR PRODUCING A HEAT STORAGE COMPOSITION AND USE THEREOF
Matthew Mekjean, Niagara Falls, N.Y., assignor to Hooker Chemical Corporation, Niagara Falls, N.Y., a corporation of New York
Filed Nov. 21, 1966, Ser. No. 595,803
Int. Cl. F24h 7/00; H05b 1/00, 3/02
U.S. Cl. 126—400                    15 Claims

ABSTRACT OF THE DISCLOSURE

Substantially anhydrous alkali metal hydroxide compositions exhibit reduced corrosive activity toward a normally corrodible metal container when they are treated at the melt with about 0.05 to 5 percent by weight of a finely divided metal common with the corrodible metal of the container. The resulting substantially anhydrous alkali metal hydroxide composition is useful as a heat storage medium and may be employed in sealed containers to store heat over long periods of time. The relatively low corrosion rate of the treated alkali metal hydroxide of this invention as compared with untreated material no longer produces the normal gaseous decomposition products other than hydrogen, which may be caused to diffuse through the container walls by periodically raising the temperature of the heat storage material above about 700° F.

---

This invention relates to a heat storage composition particularly useful for long term storage of substantially anhydrous alkali-metal hydroxide compositions in metal containers. More particularly, this invention relates to a method of rendering alkali-metal hydroxide compositions substantially noncorrosive over wide temperature ranges, particularly when sealed in a metal container and the use of such composition in sealed metal containers for the storage of heat.

Anhydrous alkali-metal hydroxide compositions have previously been suggested as heat storage mediums. The use of such anhydrous compositions are particularly effective because of the unusually high heat capacities of such compositions together with the moderate cost, particularly of sodium and potassium hydroxides and the substantially nonvolatility characteristics of these compounds over wide temperature ranges. However, to be effective as a heat storage medium for extended periods of time, such as that required in home and industrial heating, the anhydrous alkali-metal hydroxide should be contained in a container of sufficiently low corrosiveness so as to withstand destruction from corrosion for 20 years or more. It has previously been found that containers of mild steel could be used provided the alkali-metal hydroxide contained various oxidizing salts and/or corrosion inhibitors. Such oxidizing compositions were effective in preventing corrosion for long periods of time provided they had access to rejuvenating amounts of oxygen. Without these oxidizing salts and/or corrosion inhibitors, most ferrous metal containers would corrode at a rate such that they would be unsuited for long term heat storage such as 20 years or more.

Further, in many instances, the addition of oxidizing salts and/or corrosion inhibitors to form an alkali metal hydroxide composition of low corrosive activity resulted in the liberation of certain decomposition gases at the higher operating temperatures. Methods had to be devised to permit the escape of these decomposition gases so as to avoid a buildup of pressure within the storage container. Therefore, breather systems were incorporated into the heat storage container such that the decomposition gases would be exhausted from the container while atmospheric moisture was substantially excluded. Thus, it became highly desirable to eliminate such breather systems while maintaining the corrosion resistance needed for long term heat storage use.

It is an object of this invention to provide a method for preparing an alkali metal hydroxide composition for use in a sealed heat storage container. It is another object of this invention to provide a method for operating a heat storage system containing an alkali metal hydroxide composition in a manner wherein complicated breather systems can be eliminated. Another object of this invention is to provide a substantially anhydrous alkali-metal hydroxide composition suitable for long term heat storage with substantially reduced corrosion activity over a wide operating temperature range. These and other objects will become apparent to those skilled in the art from the disclosure which follows.

In accordance with the invention there is provided a method for producing a substantially anhydrous alkali metal hydroxide heat storage composition of low corrosive activity in a normally corrodible metal container comprising adding to a substantially anhydrous alkali metal hydroxide composition 0.05 to about 5 percent by weight of said hydroxide of a finely divided metal common with the corrodible metal of the seat storage container, reacting said added metal with said alkali metal hydroxide composition at a temperature between the melting point and boiling point of said alkali metal hydroxide thereby producing an alkali metal hydroxide of reduced corrosive activity to said metal container. As is normally preferred, the prepared alkali metal hydroxide composition is then sealed in the described metal heat storage container and used for the storage of heat at temperatures in the range of 200 to 1500 degrees Fahrenheit.

The treatment of the alkali metal hydroxide heat storage composition as described herein provides a composition having an extremely low corrosion rate compared to nontreated alkali metal hydroxides, the corrosion rates being such that ordinary low carbon steel or mild steel now are made suitable materials for long term heat storage containers. The corrosive activity is so reduced that even though the heat storage composition is cycled at temperatures as high as about 1500 degrees Fahrenheit, the projected life expectancy of ordinary mild steel containers is well beyond 20 years. Also, coupled with the low corrosive activity of the described compositions is the elimination of decomposition gases other than hydrogen even at the highest cycled temperatures. It has also been discovered, that in a normal operation of the heat storage container, the hydrogen which may be evolved over a period of operation, can be diffused through the container walls at temperatures above about 700 degrees Fahrenheit. Thus, the present composition has been found to be ideal for sealed heat storage containers thus eliminating complicated breather apparatuses.

The invention will be described more fully by reference to the drawing which a graph illustrating the improvement of the present invention compared to untreated caustic showing the corrosion penetration of mild steel coupons over time in days. This graph is more fully described in the examples hereinafter.

Because of the availability, low cost, structural strength, heat conductivity and the like characteristics, ferrous metals are the preferred metals for use in the heat storage container. Low carbon steel or mild steel such as that bearing an American Iron and Steel Institute Number 1020 and lower classifications, are particularly suitable wherein corrosion resistance can be incorporated into the alkali metal hydroxide heat storage composition. Other metals of Group VIII of the Periodic Chart of the Elements generally have more corrosion resistance and can be suitably used as pure metals or alloys thereof, or with iron. Particularly suited are cobalt, nickel, ruthenium, rhodium, vanadium, osmium, iridium and the like, especially as alloys of iron. Although these metals and their alloys can be made more corrosion resistant by the method of the present invention, the expense of such metals does not warrant their use for conventional heat storage except under special conditions or requirements. Various other alloys, especially nickel steels, including all percentages of nickel and iron up to about 4 percent copper, cobalt alloys containing various percentages of nickel, iron, chromium and other additives, nickel alloys containing varying percentages of cobalt, nickel, chromium and other ingredients, nickel alloys containing up to about 80 percent copper, ferrous alloys such as chrome steel, mild steel, nickel molybdenum steel, nickel-chromium steel and the like are but a few of the various alloys which can be used and made more corrosive resistant by the present method. In all of the mentioned alloys, the carbon content is below 3.0 percent and preferably below about 0.3 percent by weight. Thus, useful metals include the Group VIII metals and their alloys, as well as Group VIII metals alloyed with Group I–B, VI–B and VII–B metals of the Periodic Chart of the Elements. As previously stated, the preferred metal is low carbon steel or mild steel and, therefore, the disclosure will be directed more particularly to the use of these metals, but it is to be understood that the invention and disclosure also applies to the various metals and alloys herein described.

The alkali metal hydroxide composition used for heat storage can be a relatively pure alkali metal hydroxide such as sodium hydroxide, lithium hydroxide, potassium hydroxide, rubidium hydroxide, cesium hydroxide or strontium hydroxide or mixtures thereof. Of these, and in view of the economics and heat storage capacity, sodium hydroxide and mixtures thereof with other hydroxides is preferred. The alkali metal hydroxide used is normally a technical grade and in the case of sodium hydroxide is that produced by any of the conventional methods such as chlor-alkali diaphragm cell caustic or mercury cell caustic. Both types of caustic give comparable good results, the chloride content of diaphragm caustic having little or no detrimental effect in the present process.

The alkali metal hydroxide can be mixed with various other salts which are substantially nonvolatile at the higher cycle temperatures and which do not greatly contribute to the corrosion of the system. Such mixtures may be desirable to form various eutectic mixtures or other combinations which raise or lower the melting point of the caustic material. However, the preferred alkali metal hydroxide material is an anhydrous composition comprised of at least about 80 percent alkali metal hydroxide.

The alkali metal hydroxide composition is reacted with finely divided metal common with the metal of the heat storage container, most preferably iron. Normally, the finely divided metal is Fe or a mixture of Fe and ferrous oxide or merely a portion of the container metal ground to a finely divided state and reacted with the hydroxide composition. In most instances, particularly when low carbon steel or mild steel is used as a container metal, the added metal is finely divided iron (Fe). Preferably a saturating amount of the finely divided metal is used to saturate the hydroxide composition with metal at a temperature in the range of 500 to 2,000 degrees Fahrenheit. It is also preferred that an excess of the finely divided metal be added to the material. Normally, the amount of metal added is in the range of about 0.05 percent to about 5 percent by weight of the alkali metal hydroxide and more preferably, in the range of about 0.1 to about 2 percent by weight of the alkali metal hydroxide for substantially anhydrous material.

The reaction of the added metal with the hydroxide liberates hydrogen. The material is reacted in the molten state at a temperature of about 500 to 2,000 degrees Fahrenheit until the liberation of hydrogen substantially subsides. With the metallic iron and sodium hydroxide, the reaction is believed to follow the equation:

$$2Fe + 8NaOH \rightarrow Na_2Fe_2O_4 + 3Na_2O + 4H_2\uparrow$$

If some water is present sodium ferrite is believed to be formed according to the equation:

$$2Fe + 2H_2O + 2NaOH \rightarrow 3H_2\uparrow + Na_2Fe_2O_4$$

The sodium ferrite is believed to decompose according to the equation:

$$Na_2Fe_2O_4 \longrightarrow Na_2O + Fe_2O_3 \xrightarrow{(NaOH)} Na_2Fe_2O_4 + H_2O + Na_2O$$

In the above equation, the water would immediately react with the sodium monoxide to form sodium hydroxide. Since the formed sodium monoxide is a strong scavenger for water, the last traces of water in the anhydrous alkali metal hydroxide composition are scavenged therefrom and converted to sodium hydroxide. Thus, a completely anhydrous system is formed which is stripped of the last traces of moisture according to equation:

$$Na_2Fe_2O_4 = Na_2O \cdot Fe_2O_3 \xrightarrow{H_2O} 2NaOH + Fe_2O_3\downarrow$$

Although finely divided metal is preferred, the particular particle size used can vary widely because the size merely effects the rate of reaction with the molten hydroxide. Therefore, smaller particle sizes (i.e., 0.001 inch+) are most desirable but larger particle sizes up to about 0.2 inch can be used with a corresponding slower dissolving rate.

Upon the substantial completion of the hydrogen liberation, the alkali metal hydroxide composition is in condition for sealing within a heat storage container.

The heat storage container is subsequently used for the storage of heat. The stored heat can be used for heating water, air or other heat transfer mediums which in turn provide heat for homes, hot water for various industrial and domestic purposes and the like. During the operation of the heat storage system, the heat storage medium is cycled through a temperature range of about 250 to about 1,250 degrees Fahrenheit. During extended periods of operation, additional hydrogen will be produced due to the further dissolving of the finely divided metal within the alkali metal hydroxide melt. Since hydrogen is the only gas produced even at the highest operating temperatures, this gas is eliminated from the storage container by diffusing it through the walls of the container at temperatures above about 700 degrees Fahrenheit. The possible danger of overpressurizing a sealed heat storage container is thus substantially eliminated. The diffusion occurs readily at higher temperatures because the hydrogen is then in atomic form.

The diffusion rate of hydrogen through the container walls is dependent upon the type of metal, the temperature, and the thickness of the container wall. With the metals and alloys used in the present invention wherein the wall thickness is in the range of about 0.01 to about 0.3 inch, the hydrogen diffusion rate at temperatures about about 700 degrees Fahrenheit is at a rate substantially in excess of the rate at which it is formed. Therefore, the present system can be operated as a sealed system for an indefinite time by periodically cycling the heat storage composition to a temperature of about 700 degrees Fahrenheit or higher.

The invention will be readliy understood with reference to the following examples which are illustrations of certain preferred embodiments of the present invention. Unless otherwise indicated, all temperatures are in degrees Fahrenheit and all parts and percentages used herein are by weight.

EXAMPLES 1–3

Experiments were conducted to determine the corrosion rate in closed containers using two different prior art oxidizing alkali metal hydroxide compositions and comparing these to the metal containing alkali metal hydroxide composition of the present invention.

Heat storage containers were constructed using mild steel of a thickness of about 0.20 inch. The composition of the present invention (Example 1) was then prepared by adding one percent by weight of finely divided iron powder to technical grade sodium hydroxide. The technical grade sodium hydroxide contained 1.2 percent sodium chloride and about 1 percent sodium carbonate. The sodium hydroxide to which the iron powder had been added was heated at a temperature of 900 degrees Fahrenheit for several hours until the evolution of hydrogen, which commenced upon the addition of the metal powder, had substantially ceased. The prepared molten caustic was then placed in a prepared mild steel heat storage container.

A sufficient amount of the prepared caustic was added to the container so that it filled the container to within about 2 inches from the top. Preweighted mild steel coupons were suspended within the heat storage container, with one set of coupons submerged in the liquid caustic and another set of coupons was placed above the molten caustic. The container was then sealed.

For comparison, two typical oxidizing sodium hydroxide compositions which were found to be particularly suited for breathing type modules, were also prepared and sealed in similar heat storage containers. The first oxidizing composition (Example 2) was comprised of 90.8 percent technical grade diaphragm type sodium hydroxide, 8.0 percent sodium nitrate, 0.2 percent manganese dioxide and 1.0 percent sodium chromate. Again, the fused salt was placed in the heat storage container filled to within about 2 inches from the top and a set of metal coupons was suspended within the caustic material with an additional set of coupons being positioned above the caustic material.

The second oxidizing composition (Example 3) was also particularly suited for the breather type heat storage apparatuses. It was comprised of 93.2 percent mercury grade sodium hydroxide, 6.0 percent sodium chromate and 0.8 percent titanium dioxide. The mercury grade caustic contained substantially no sodium chloride. Again, this composition was placed in a similar heat storage container filled to within about 2 inches from the top and a set of mild steel coupons was suspended within the caustic and another set of mild steel coupons was suspended above the caustic material.

Attached to each of the three heat storage containers was a mercury monometer used to monitor the pressures within the containers.

By observing the pressures within the cell at an operating temperature cycling between 200 and 900 degrees Fahrenheit, it was soon found that the pressure gradually dropped in the cell containing the iron powder dissolved in the sodium hydroxide. After a period of about 12 days of operation, the pressure in the metal container containing the heat storage composition of Example 1 was in the range of 350 to 500 millimeters of mercury absolute pressure at 900 degrees Farhenheit. The pressures within the cells containing the oxidizing compositions remained static for about seven days and then began to rise rapidly above atmospheric pressure. After three weeks of operation at temperatures up to 900 degrees Fahrenheit, all of the sealed container were opened and the corrosion rates on the coupons determined by determining the change in the weight of the coupons sealed within the heat storage containers. The change in weights of the coupons during the period of the test were then projected to determine the expected penetration in 20 years based on an expected use in home heating of 8 months per year.

Table I shows the results obtained wherein Example 1 is the results obtained using the method and composition of the present invention, Example 2 is the oxidized composition using technical grade sodium hydroxide and Example 3 is the oxidizing composition using mercury grade caustic.

TABLE I.—PROJECTED 20-YEAR PENETRATION

| Above salt composition: | Below salt composition |
|---|---|
| Example 1, 0.010 | 0.010 |
| Example 2, 1.60 | 0.02 |
| Example 3, 0.18 | 0.13 |

As is readily apparent, the sealing of the container to exclude air for rejuvenation of the oxidizing compositions rapidly accelerates the corrosion rate compared to Example 1, particularly for diaphragm caustic. Thus, previous oxidizing compositions as described are unsuited for completely sealed heat storage containers both because of the pressure buildup and because of the rapid loss of the corrosion preventatives by excluding rejuvenating oxygen from the system. The composition of the present invention is found to be well within safe corrosion limits, even for extremely thin steel plate of about 0.02 inch.

In the same manner of Example 1, metal powder from ferrous alloys and alloys of metals of Groups VIII, I-B, VI-B and VII-B are rendered less corrosive to caustic by dissolving a saturating amount of finely divided metal common with the metal alloy in an alkali metal hydroxide composition. In operating a sealed heat storage container having an alkali metal hydroxide composition substantially saturated with the metal common with the container, lower corrosion rates are obtained.

EXAMPLES 4 THROUGH 7

The method of the present invention was tested using both diaphragm type sodium hydroxide and mercury grade sodium hydroxide to measure the reduced corrosion rates in sealed containers over extended periods of time. The tests were conducted in the manner of Examples 1 through 3, wherein preweighed mild steel coupons were immersed in the caustic material in heat storage modules, the modules sealed and subsequently operated at a substantially constant temperature of 900 degrees Fahrenheit for extended periods of time. Measurements were made at intervals by opening the module, removing and weighing the coupons, replacing them in the module, reestablishing the pressure conditions in the module as near as possible and continuing the test. Because substantially no severe pitting was observed, the penetration indicated in the drawing was based on the assumption that the attack was uniform, which assumption was shown to be essentially correct based on extensive testing data.

Example 4 represents standard chlor-alkali diaphragm type caustic without treatment in accordance with the present invention. The diaphragm caustic was comprised of about 97.8 percent sodium hydroxide, 1.2 percent sodium chloride and about 1 percent sodium carbonate. This same composition was used for the other examples, wherein diaphragm cell caustic is indicated.

Example 5 represents the tests conducted using mercury grade sodium hydroxide which was pretreated by reacting 1 percent powdered iron (Fe) based on the weight of the caustic at 900 degrees Fahrenheit until the hydrogen liberation substantially ceased and subsequently dried over a hydrogen atmosphere for 5 hours.

Example 6 represents the tests conducted utilizing diaphragm cell caustic pretreated by reacting 2 percent powdered iron (Fe) based on the weight of caustic at 900 degrees Fahrenheit until the hydrogen liberation substantially ceased, and subsequently dried under a hydrogen atmosphere for 24 hours.

Example 7 represents the tests conducted utilizing mercury grade caustic pretreated by reacting 1 percent of powdered iron based on the weight of the caustic at a temperature of 900 degrees Fahrenheit until the liberation of hydrogen was substantially completed.

The results of the tests are tabulated in the drawing, wherein it is graphically illustrated that without the treatment of the caustic with a metal in accordance with the present invention, the corrosion rate is rapidly accelerated at a rate more than twice that of the treated caustic.

Further, as is readily seen by reviewing the drawing, that the corrosion rate is most rapid during the first 60 days or so with the treated caustic, which rate then moderates substantially, while the corrosion rate of the untreated caustic of Example 4 continues at the accelerated rate, thereby rapidly destroying the utility of the container in a relatively short period of time. The greatly moderated corrosion rates of the present invention thus make feasible the use or ordinary mild steel containers for sealed heat storage units which will have a projected life expectancy of at least 20 years.

In a like manner, other ferrous metals and alloys as described herein are passivated to the corrosive action of alkali metal hydroxides including potassium, lithium, cesium, rubidium and the like hydroxide and mixtures with correspondingly good results.

While there have been described various embodiments of the invention, the methods described are not intended to limit the scope of the invention as it is realized that changes therein are possible.

What is claimed is:

1. A method for producing a substantially anhydrous alkali-metal hydroxide heat storage composition having low corrosive activity in a normally corrodible metal heat storage container comprising adding to a substantially anhydrous alkali-metal hydroxide 0.05 to 5 percent by weight of said hydroxide of a finely divided metal common with the corrodible metal of the heat storage container, reacting said added metal with said alkali-metal hydroxide at a temperature between the melting point and boiling point of said alkali-metal hydroxide, thereby producing an alkali-metal hydroxide of reduced corrosive activity to said metal container.

2. The method of claim 1 wherein the container metal is mild steel and wherein the metal added to the hydroxide composition is iron.

3. The method of claim 1 wherein a saturating amount of metal is added to the alkali-metal hydroxide.

4. The method of claim 1 wherein more than a saturating amonut of metal is added to the alkali-metal hydroxide.

5. The method of claim 1 wherein the alkali-metal hydroxide composition comprises more than about 80 percent sodium hydroxide.

6. The method of claim 1 wherein the prepared alkali-metal hydroxide composition is sealed in a ferrous metal container.

7. The method of claim 1 wherein the alkali-metal hydroxide is sodium hydroxide.

8. The process of claim 1 wherein the alkali-metal hydroxide composition is prepared by adding to substantially anhydrous sodium hydroxide about 0.05 to 5 percent of finely divided iron, reacting said added metal with said sodium hydroxide at a temperature of about 500 to 2,000 degrees Fahrenheit, thereby producing a sodium hydroxide composition of reduced corrosive activity in ferrous metal containers.

9. A method of operating a heat storage system comprised of a substantially anhydrous alkali-metal hydroxide composition in a sealed, normally corrodible metal container comprising reacting at least a saturating amount of finely divided metal common with the corrodible metal of the metal container with a substantially anhydrous alkali-metal composition at a temperature between the melting point and boiling point of said alkali-metal hydroxide, subsequently sealing said prepared alkali-metal hydroxide composition in a normally corrodible metal cointainer, storing heat in said composition at a temperature of about 200 to 1,500 degrees Fahrenheit and periodically heating said composition to a temperature above about 700 degrees Fahrenheit to thereby diffuse through said container walls the gaseous decomposition product which may be formed.

10. The method of claim 9 wherein the metal container is mild steel having a thickness of about 0.03 to 0.4 inch.

11. The method of claim 9 wherein the gaseous decomposition product is substantially hydrogen.

12. The method of claim 9 wherein the alkali-metal hydroxide is sodium hydroxide.

13. An article of manufacture consisting essentially of anhydrous alkali-metal hydroxide reacted with about 0.05 to 5 percent ferrous metal.

14. The article of claim 13 wherein the alkali-metal hydroxide is sodium hydroxide.

15. The article of claim 13 wherein the alkali-metal hydroxide is sealed in a ferrous metal container.

References Cited

UNITED STATES PATENTS

| | | |
|---|---|---|
| 2,915,397 | 12/1959 | Telkes. |
| 3,320,408 | 5/1967 | Mekjean _____ 217—530 |
| 3,356,834 | 12/1967 | Mekjean. |
| 3,400,249 | 9/1968 | Mekjean et al. ____ 126—400 X |

FREDERICK L. MATTESON, JR., Primary Examiner

ROBERT A. DUA, Assistant Examiner

U.S. Cl. X.R.

165—134; 219—378; 252—71